(12) United States Patent
Wang

(10) Patent No.: US 8,365,766 B2
(45) Date of Patent: Feb. 5, 2013

(54) OBSERVATION VALVE STRUCTURE

(75) Inventor: Chi-Yuan Wang, Lukang Chang Hua (TW)

(73) Assignee: Y. S. Hardware Co., Ltd., Lukang Chang Hua (TW)

( * ) Notice: Subject to any disclaimer, the term of this patent is extended or adjusted under 35 U.S.C. 154(b) by 301 days.

(21) Appl. No.: 12/977,010

(22) Filed: Dec. 22, 2010

(65) Prior Publication Data

US 2012/0161053 A1    Jun. 28, 2012

(51) Int. Cl.
*F16K 3/08* (2006.01)

(52) U.S. Cl. ............... 137/556.6; 137/559; 137/625.31; 251/315.14

(58) Field of Classification Search ............. 137/625.31, 137/625.32, 553, 556, 556.3, 556.6, 559; 251/315.14
See application file for complete search history.

(56) References Cited

U.S. PATENT DOCUMENTS

| 1,333,048 | A | * | 3/1920 | Webster | 137/625.32 |
| 2,051,401 | A | * | 8/1936 | Winterstein | 236/15 A |
| 3,794,071 | A | * | 2/1974 | Scott | 137/599.18 |

* cited by examiner

*Primary Examiner* — Eric Keasel
*Assistant Examiner* — Kevin E Lynn
(74) *Attorney, Agent, or Firm* — Jackson IPG PLLC

(57) ABSTRACT

An observation valve structure includes an inlet pipe joint. The inlet pipe joint has an outer threaded section at an inner end thereof, an annular guide groove in the inlet pipe joint, and guide holes at the inner end thereof. The annular guide groove communicates with the guide holes. The inlet pipe joint has a stop trough at the inner end thereof for insertion of an annular gasket. A holder is provided on top of the connector body. The holder has two threaded holes at two sides thereof close to the inlet end of the connector body. A plate is positioned on the holder by two screws which are screwed in the threaded holes. The plate has a top surface with characters which are perpendicular to each other, a position hole disposed close to the middle character, and two apertures disposed at an outer side of the other two characters for insertion of the two screws. The handle has an indication plate. The indication plate has a positioning bead hole for insertion of a positioning bead. Through the right side or the left side of the indication plate limited by the screws or the positioning bead slid into the positioning bead hole and stopped, the handle cooperates with the characters of the plate to control rotation of the ball shutter. Two opposing sides of the ball shutter are airtight through two uniform annular gaskets which can be replaced with ease. The present invention can limit and position the handle and enhance side water flow.

4 Claims, 7 Drawing Sheets

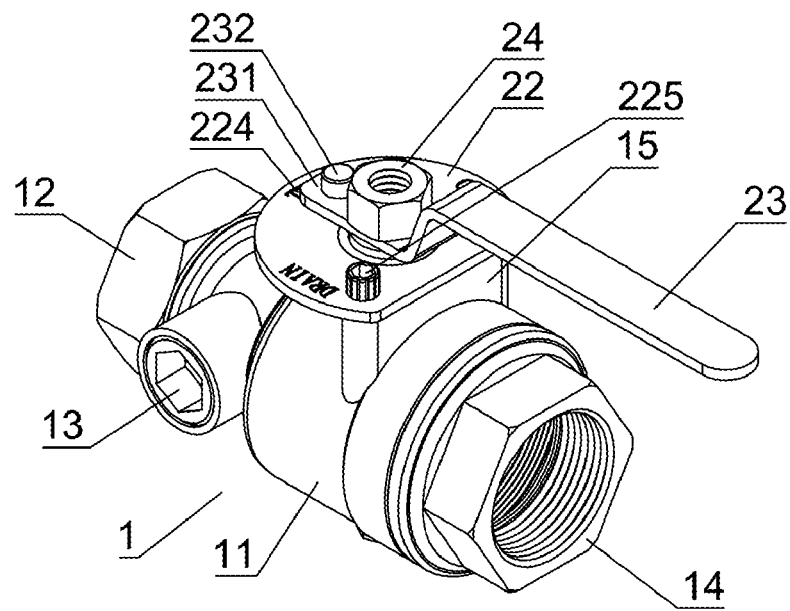
Fig. 2
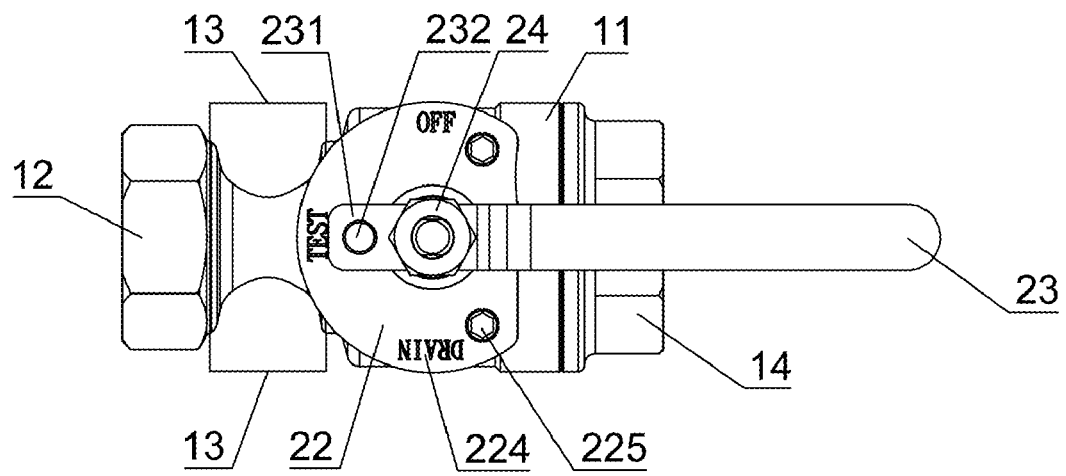
Fig. 2-A

Fig. 4-A

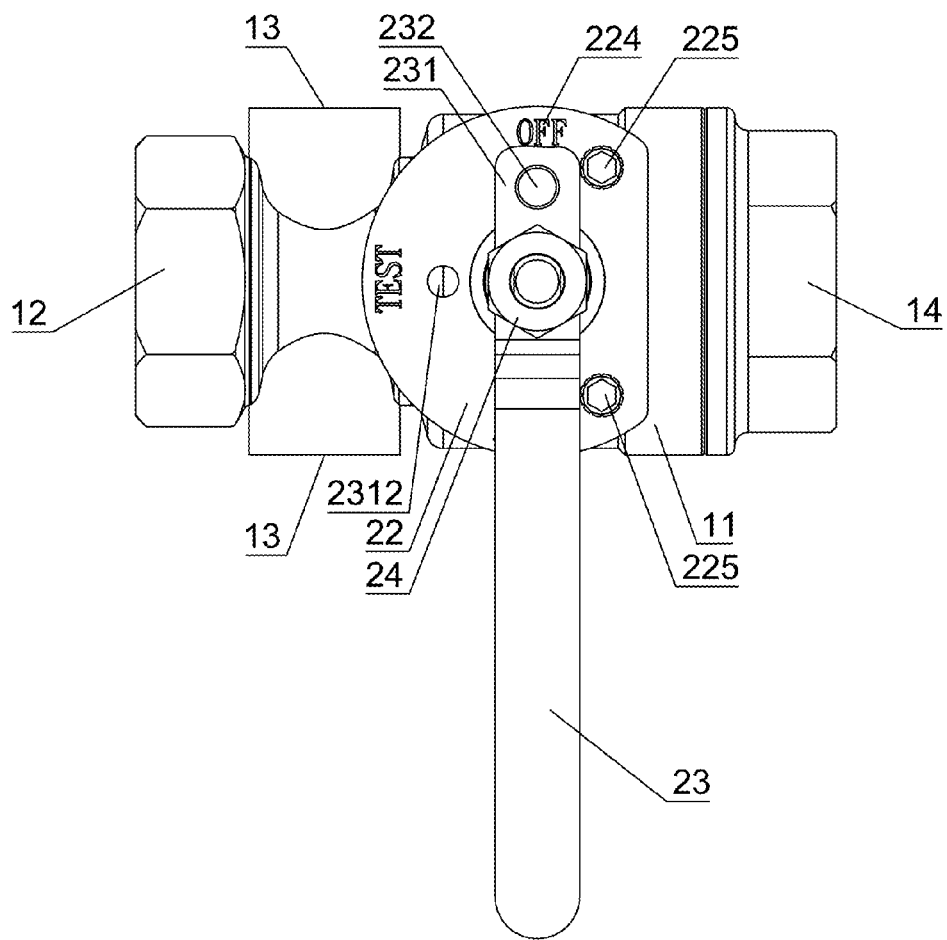
Fig. 5
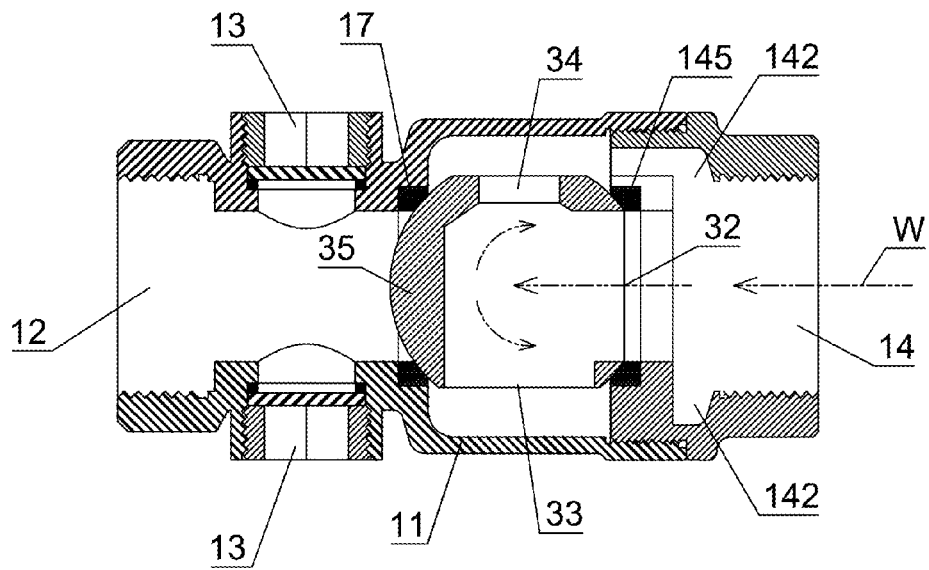
Fig. 5-A

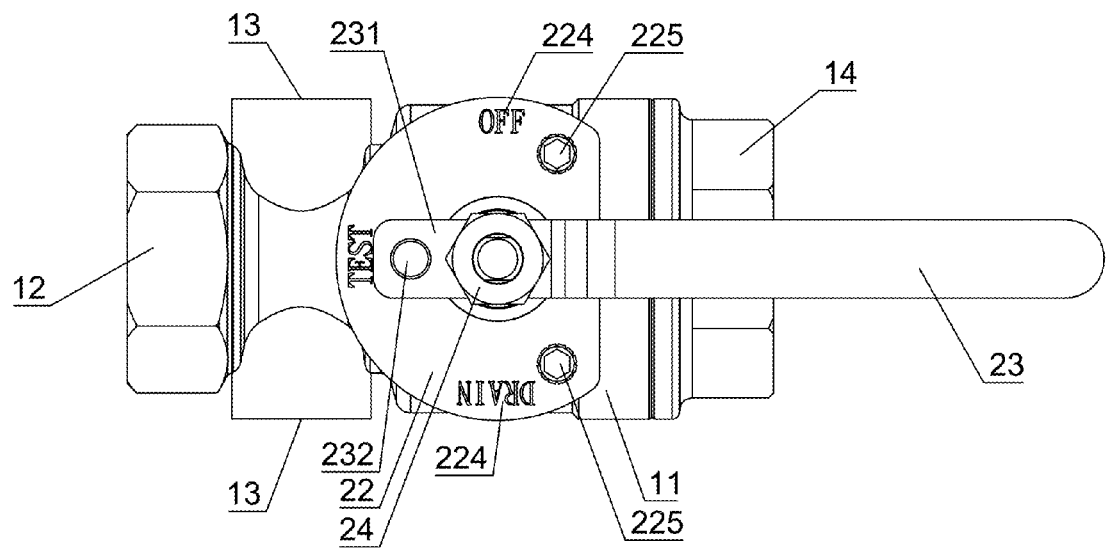
Fig. 6
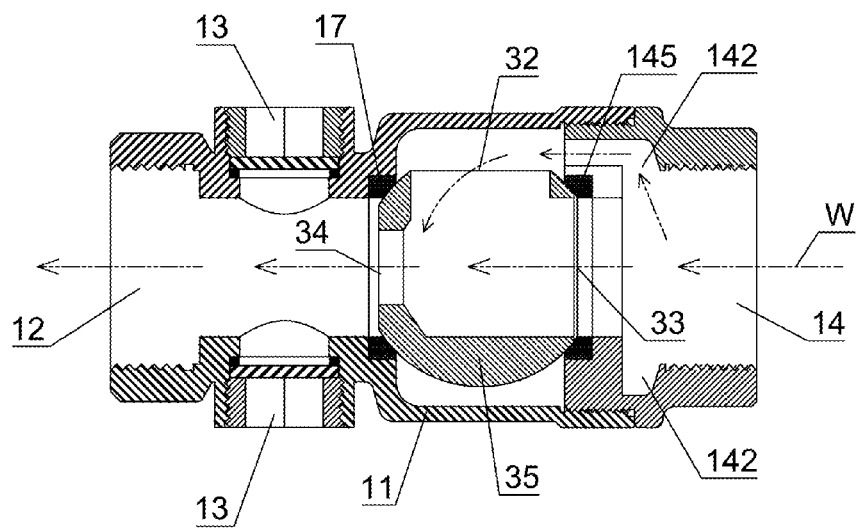
Fig. 6-A

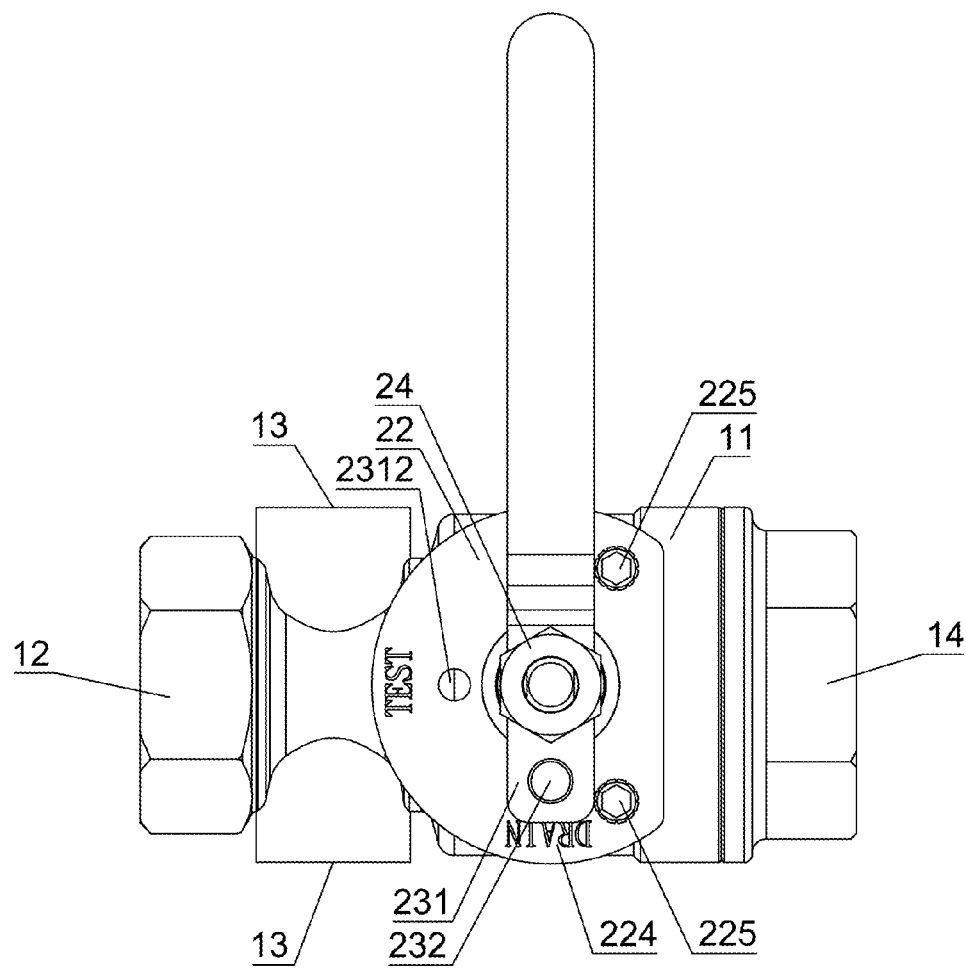
Fig. 7
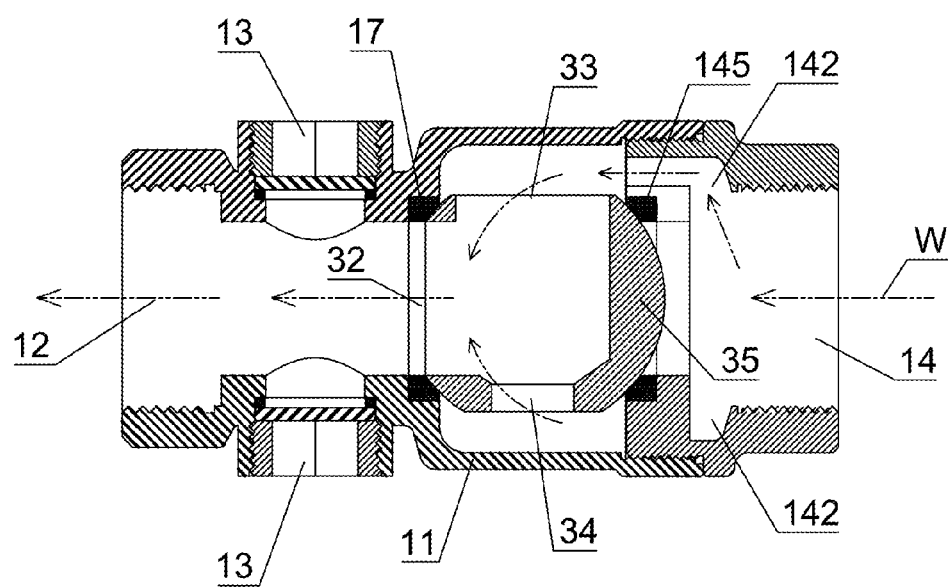
Fig. 7-A

OBSERVATION VALVE STRUCTURE

BACKGROUND OF THE INVENTION

1. Field of the Invention

The present invention relates to an observation valve structure, and more particularly to one having an inlet pipe joint. The inlet pipe has an outer threaded section at an inner end thereof, an annular guide groove in the inlet pipe joint, and guide holes at the inner end thereof. The annular guide groove communicates with the guide holes. The inlet pipe joint has a stop trough at the inner end thereof for insertion of an annular gasket which is used to clamp one side of a ball shutter. A plate and a handle are pivotally connected to a holder. The handle has an indication plate and a positioning bead and the plate has a positioning hole and two threaded holes to limit and position the handle and to enhance side water flow.

2. Description of the Prior Art

A conventional observation valve, referring to U.S. Pat. No. 6,196,262, comprises a conical connecting body. The center of the conical connecting body has a pipe opening for insertion of a three-way ball shutter. The conical connecting body further has a plurality of holes in a periphery portion for side water flow. A rotatable disc with a lever is provided on top of the observation valve. The rotatable disc is positioned by means of three positioning bead holes of the rotatable disc and a positioning bead disposed under the rotatable disc to control water flow by the three-way ball shutter in the OFF, TEST, DRAIN position. If the conical connecting body is a resilient body, its structure is not strong enough and deformed easily. If the conical connecting body is a rigid body, its mating tolerance must be least. The three-way ball shuttle is wearing easily and the specific parts are not common to increase the cost. The disc is rotated by the positioning bead hole to aim at the positioning bead, without an indication to show the OFF, TEST, DRAIN position. When the elastic member in the positioning bead is fatigued, it is easily displaced by an external force.

SUMMARY OF THE INVENTION

The primary object of the present invention is to provide an observation valve structure which comprises a pipe connector. The pipe connector is composed of a connector body, an outlet pipe joint at an outlet end of the connector body, two observation mirror assemblies, and an inlet pipe joint at an inlet end of the connector body. The pipe connector comprises a driving shaft assembly and a ball shutter which is disposed in the connector body and driven by the driving shaft assembly. The inlet pipe joint has an outer threaded section at an inner end thereof, an annular guide groove in the inlet pipe joint, and guide holes at the inner end thereof. The annular guide groove communicates with the guide holes. The inlet pipe joint has a stop trough at the inner end thereof for insertion of an annular gasket. A holder is provided on top of the connector body. The holder has two threaded holes at two sides thereof close to the inlet end of the connector body. A plate is positioned on the holder by two screws which are screwed in the threaded holes. The plate has a top surface with OFF, TEST, DRAIN characters which are perpendicular to each other, a position hole disposed close to the middle character, and two apertures disposed at an outer side of the other two characters for insertion of the two screws. The handle has an indication plate. The indication plate has a rotation hole for insertion of a driving rod of the driving shaft assembly and a positioning bead hole for insertion of a positioning bead. When the indication plate of the handle is pulled to the OFF character of the plate, the right side of the indication plate will be limited by one screw to stop turning and a stop wall of the ball shutter will be at the outlet end of the connector body to stop drain of the water flow. When the indication plate of the handle is pulled to the DRAIN character of the plate, the left side of the indication plate will be limited by another screw to stop turning and the main passage of the ball shutter will be at the outlet end of the connector body and the stop wall will be at the inlet end of the connector body to stop the opening of the inlet pipe joint. The water flow will flow from the guide holes through the guide groove to the second passage and the side passage and then drain out through the main passage. When the indication plate of the handle is pulled to the TEST character of the plate, the positioning bead hole will bring the positioning bead to slide in the positioning hole and to be positioned thereat. The side passage of the ball shutter will be at the outlet end of the connector body and the main passage will be at the inlet end of the connector body, namely, at the opening of the inlet pipe joint. The water flow will flow from the guide holes through the guide groove to the second passage in conjunction with the main passage to generate air bubbles and then drain out through the side passage. The observation mirror assemblies are used to observe the water flow. The handle provides an exact indication function and won't be displaced after being positioned.

A further object of the present invention is to provide an observation valve structure which provides an annular gasket received in the stop trough of the inlet pipe joint and another annular gasket at the other end of the ball shutter to clamp the ball shutter tightly, providing a better airtight function. The two annular gaskets are uniform specification. The guide groove and the guide holes of the inlet pipe joint facilitate the generation of air bubbles. The same parts can be replaced with ease.

BRIEF DESCRIPTION OF THE DRAWINGS

FIG. 2 is a perspective view according to the preferred embodiment of the present invention;

FIG. 2-A is a top view according to the preferred embodiment of the present invention;

FIG. 4-A is a sectional view of the inlet pipe joint according to the preferred embodiment of the present invention;

FIG. 5 is a top view according to the preferred embodiment of the present invention in the OFF state;

FIG. 5-A is a schematic view showing the water flow according to the preferred embodiment of the present invention in the OFF state;

FIG. 6 is a top view according to the preferred embodiment of the present invention in the TEST state;

FIG. 6-A is a schematic view showing the water flow according to the preferred embodiment of the present invention in the TES state;

FIG. 7 is a top view according to the preferred embodiment of the present invention in the DRAIN state; and FIG. 7-A is a schematic view showing the water flow according to the preferred embodiment of the present invention in the DRAIN state.

DETAILED DESCRIPTION OF THE PREFERRED EMBODIMENTS

Embodiments of the present invention will now be described, by way of example only, with reference to the accompanying drawings.

Figure 1:
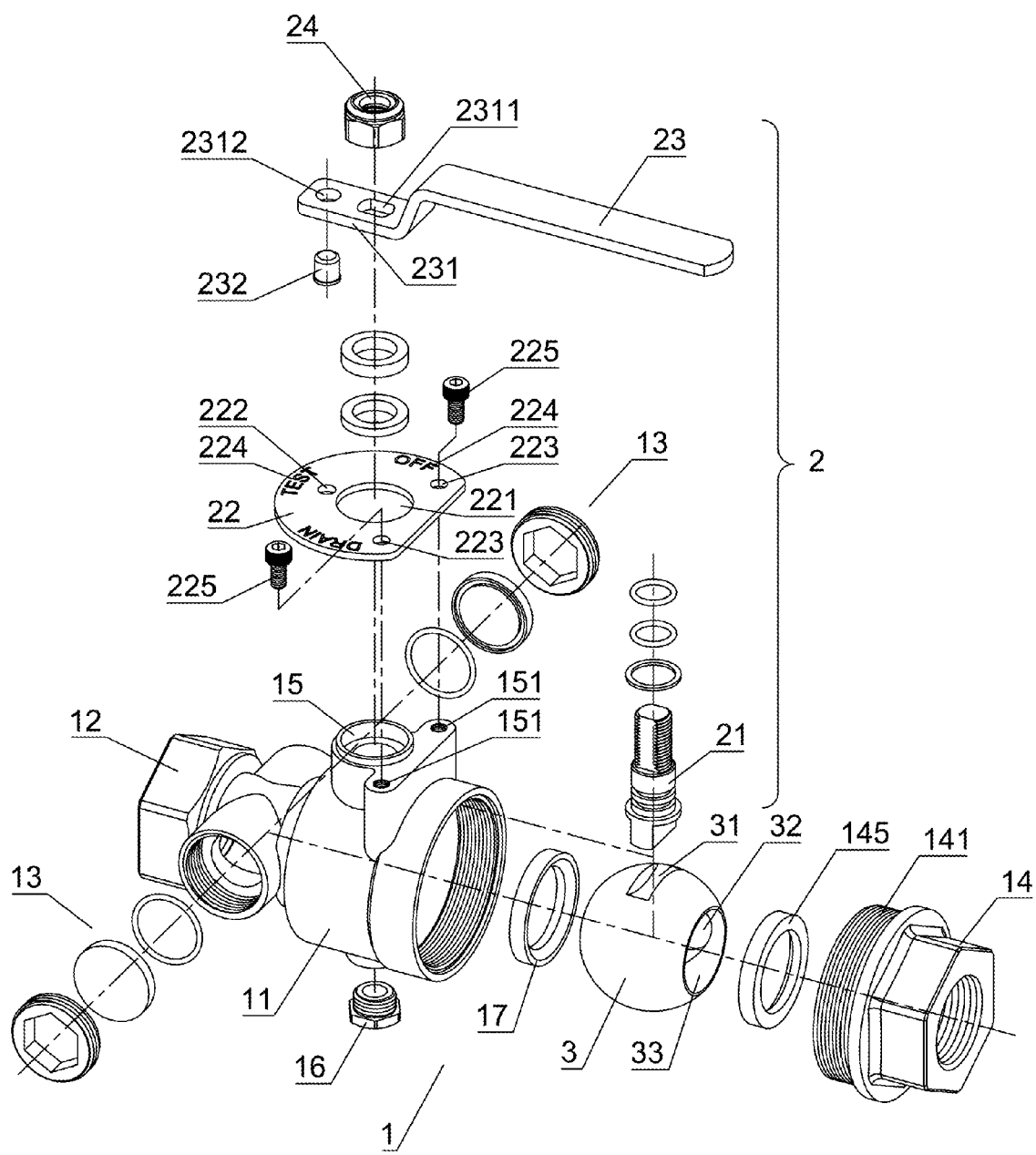
FIG. 1 is an exploded view according to a preferred embodiment of the present invention.
Figure 4:
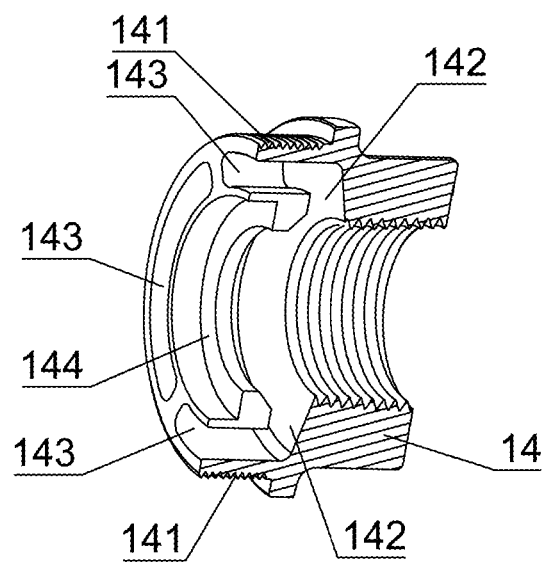
FIG. 4 is a perspective view of an inlet pipe joint according to the preferred embodiment of the present invention.
Figure 4:
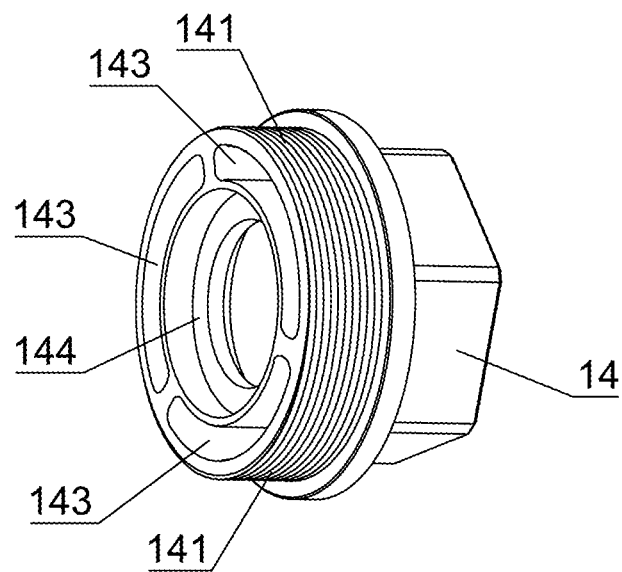

As shown in FIG. 1, FIG. 2, FIG. 4, FIG. 1-A, FIG. 4-A, an observation valve structure according to a preferred embodiment of the present invention comprises a pipe connector 1 which is composed of a connector body 11, an outlet pipe joint 12 at an outlet end of the connector body 11, two observation mirror assemblies 13, and an inlet pipe joint 14 at an inlet end of the connector body 11. The pipe connector 1 comprises a driving shaft assembly 2 and a ball shutter 3 which is disposed in the connector body 11 and driven by the driving shaft assembly 2.

The pipe connector 1 comprises an annular gasket 17 at the outlet end of the connector body 11. The outlet pipe joint 12 is connected to the outlet end of the connector body 11. The two observation mirror assemblies 13 are located at two sides of the connector body 11. The inlet pipe joint 14 is connected to the inlet end of the connector body 11. The inlet pipe joint 14 has an outer threaded section 141 at an inner end thereof, an annular guide groove 142 in the inlet pipe joint 14, and guide holes 143 at the inner end thereof. The annular guide groove 142 communicates with the guide holes 143 for water to flow therein and to generate air bubbles. The inlet pipe joint 14 has a stop trough 144 at the inner end thereof for insertion of another annular gasket 145, as shown in FIG. 4 and FIG. 4-A. A holder 15 is provided on top of the connector body 11. The holder 15 is pivotally connected with the driving shaft assembly 2 and the ball shutter 3. The holder 15 has two threaded holes 151 at two sides thereof close to the inlet end of the connector body 11. A plate 22 is positioned on the holder 15 by two screws 225 which are screwed in the threaded holes 151. A blocker 16 is provided at the bottom of the connector body 11. The ball shutter 3 can be rotated in the connector body 11.

The driving shaft assembly 2 comprises a driving rod 21. One end of the driving rod 21 is engaged on the ball shutter 3, and another end of the driving rod 21 is inserted through the holder 15, a through hole 221 of the plate 22 and a rotation hole 2311 of a handle 23 and locked with a nut 24. The plate 22 having the through hole 221 is placed on the holder 15. The plate 22 has a top surface with OFF, TEST, DRAIN characters 224 which are perpendicular to each other, a position hole 22 which is disposed close to the middle character 224, and two apertures 223 which are disposed at an outer side of the other two characters 224 for insertion of the two screws 225. The handle 23 has an indication plate 231 with the rotation hole 2311 and a positioning bead hole 2312. The positioning bead hole 2312 is provided with a positioning bead 232. The handle 23 cooperates with the characters 224 of the plate 22 to control rotation of the ball shutter 3.

The ball shutter 3 has an engaging slot 31 for engagement of the driving rod 21, a main passage 32 and a secondary passage 33 which have larger openings and are perpendicular to each other, a side passage 34 which has a smaller opening and is located opposite the second passage 33 and perpendicular to the main passage 32, and a stop wall 35 opposite the main passage 32. The ball shutter 3 is clamped by the annular gaskets 145, 17 and the blocker 16 to control the water flow W in the pipe connector 1 when the ball shutter 3 is rotated in the OFF, TEST, DRAIN position. Accordingly, the handle 23 is pulled to position the ball shutter 3 to enhance the use of the inlet pipe joint 14.

Figure 3:
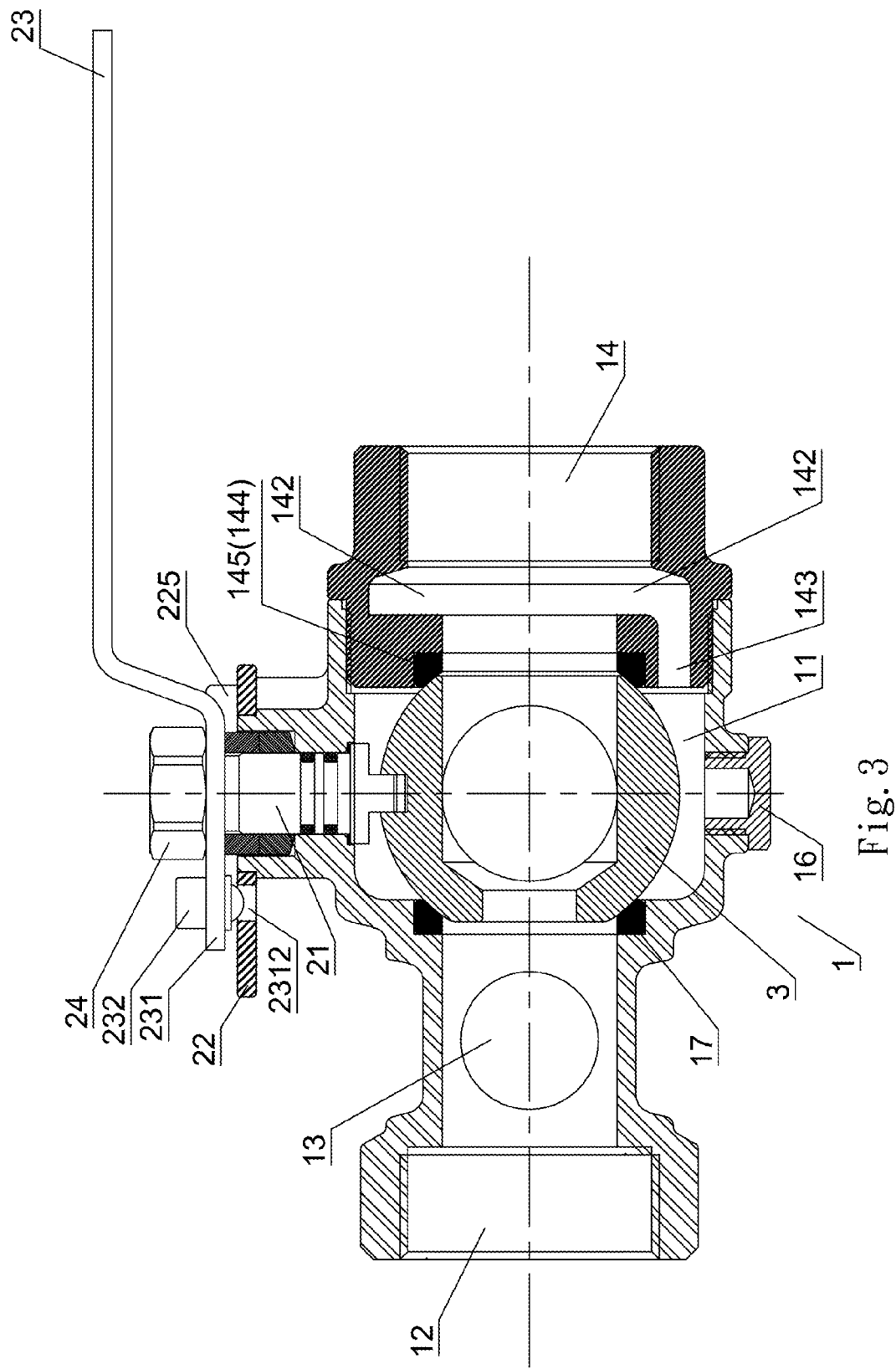
FIG. 3 is a cross-sectional view according to the preferred embodiment of the present invention.

FIG. 2, FIG. 3, FIG. 5 to FIG. 7, FIG. 5-A, FIG. 6-A, and FIG. 7-A show a preferred embodiment of the present invention. The driving shaft assembly 2 and the ball shaft 3 are coupled to the connector body 11, as shown in FIG. 3. When the indication plate 231 of the handle 23 is pulled to the OFF character 224 of the plate 22, the right side of the indication plate 231 will be limited by one screw 225 to stop turning, as shown in FIG. 5, and the stop wall 35 of the ball shutter 3 will be at the outlet end of the connector body 11 to stop drain of the water flow W, as shown in FIG. 5-A. When the indication plate 231 of the handle 23 is pulled to the DRAIN character 224 of the plate 22, the left side of the indication plate 231 will be limited by another screw 225 to stop turning, as shown in FIG. 7, and the main passage 32 of the ball shutter 3 will be at the outlet end of the connector body 11 and the stop wall 35 will be at the inlet end of the connector body 11 to stop the opening of the inlet pipe joint 14. The water flow W will flow from the guide holes 143 through the guide groove 142 to the second passage 33 and the side passage 34 and then drain out through the main passage 32, as shown in FIG. 7-A. When the indication plate 231 of the handle 23 is pulled to the TEST character 224 of the plate 22, the positioning bead hole 2312 will bring the positioning bead 232 to slide in the positioning hole 222 and to be positioned thereat, as shown in FIG. 6. The side passage 34 of the ball shutter 3 will be at the outlet end of the connector body 11 and the main passage 32 will be at the inlet end of the connector body 11, namely, at the opening of the inlet pipe joint 14. The water flow W will flow from the guide holes 143 through the guide groove 142 to the second passage 33 in conjunction with the main passage 32 to generate air bubbles and then drain out through the side passage 34, as shown in FIG. 5-A. The observation mirror assemblies 13 are used to observe the water flow W. The handle 23 provides an exact indication function and won't be displaced after being positioned.

Referring to FIG. 3, FIG. 4, FIG. 4-A, the annular gasket 145 received in the stop trough 144 of the inlet pipe joint 14 and the annular gasket 17 at the other end of the ball shutter 3 are used to clamp the ball shutter 3, providing a better airtight function. The two annular gaskets 145, 17 are uniform specification. The guide groove 142 and the guide holes 143 of the inlet pipe joint 14 facilitate the generation air bubbles when in the TEST state. The same parts can be replaced with ease.

Accordingly, the present invention provides a positioning function to the handle 23, has the uniform annular gaskets and enhances the structure.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. An observation valve structure, comprising a pipe connector which is composed of a connector body, an outlet pipe joint at an outlet end of the connector body, two observation mirror assemblies and an inlet pipe joint at an inlet end of the connector body, the pipe connector comprising an annular gasket at the outlet end of the connector body, the pipe connector comprising a driving shaft assembly and a ball shutter which is disposed in the connector body and driven by the driving shaft assembly, the driving shaft assembly comprising a driving rod, an upper end of the driving rod inserting through a holder disposed on the connector body, a through hole of a plate disposed on the holder and a rotation hole of a handle of the driving shaft assembly and locked with a nut, the ball shutter having a main passage and a secondary passage which are perpendicular to each other, a side passage which is located opposite the second passage and perpendicular to the main passage and a stop wall opposite the main passage, and characterized by:

the inlet pipe joint having an outer threaded section at an inner end thereof, an annular guide groove in the inlet pipe joint, guide holes at the inner end thereof and a stop trough at the inner end thereof for insertion of another annular gasket, the annular guide groove communicating with the guide holes, the plate having the through hole being placed on the holder, the plate having a top surface with characters which are perpendicular to each other, a position hole disposed close to the middle character and two apertures disposed at an outer side of the other two characters for insertion two screws which are screwed in two threaded holes of the holder close to the inlet end of the connector body, the handle having an indication plate with a positioning bead hole, the positioning bead hole being provided with a positioning bead; through a right side or a left side of the indication plate limited by the screws or the positioning bead slid into the positioning bead hole, the handle cooperating with the characters of the plate to control rotation of the ball shutter, two opposing sides of the ball shutter being airtight through the two annular gaskets.

2. The observation valve structure as claimed in claim 1, wherein the characters are OFF, TEST, DRAIN.

3. The observation valve structure as claimed in claim 1, wherein the two annular gaskets are uniform parts.

4. The observation valve structure as claimed in claim 2, wherein when the indication plate of the handle is pulled to the TEST character of the plate, the side passage of the ball shutter is at the outlet end of the connector body and the main passage is at the inlet end of the connector body, namely, at the opening of the inlet pipe joint, and water flows from the guide holes through the guide groove to the second passage and gathers the main passage to generate air bubbles for identification.

* * * * *